(12) United States Patent
Ward et al.

(10) Patent No.: US 7,003,267 B2
(45) Date of Patent: Feb. 21, 2006

(54) INTERNAL PART DESIGN, MOLDING AND SURFACE FINISH FOR COSMETIC APPEARANCE

(75) Inventors: Isaac Ward, Queenscliff (AU); Souhail Abood, San Diego, CA (US); David Owen West, San Diego, CA (US); Dietmar F. Wennemer, San Diego, CA (US); Kenneth Lawrence Weselake, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 618 days.

(21) Appl. No.: 10/144,949

(22) Filed: May 14, 2002

(65) Prior Publication Data

US 2003/0216125 A1 Nov. 20, 2003

(51) Int. Cl.
*H04B 1/38* (2006.01)

(52) U.S. Cl. ............... 455/90.3; 455/550.1; 455/575.1; 428/46; 442/180

(58) Field of Classification Search ............... 455/90.3, 455/550.1, 575.1, 575.8, 344, 347, 351; 428/46; 442/180, 181
See application file for complete search history.

(56) References Cited

U.S. PATENT DOCUMENTS

| 5,993,019 | A | 10/1999 | Kline et al. | |
| 6,117,384 | A | 9/2000 | Laurin et al. | |
| 6,352,427 | B1 | 3/2002 | Hahn et al. | |
| 2001/0041239 | A1* | 11/2001 | Palmqvist et al. | 428/46 |
| 2002/0177470 | A1* | 11/2002 | Swanson et al. | 455/566 |

* cited by examiner

*Primary Examiner*—Lee Nguyen (57) ABSTRACT

A part employing internally molded shapes and surface finish to provide cosmetic features or design elements includes a body, at least a portion of which is molded of a transparent or semi-transparent material having an internal surface and an external surface. A cosmetic feature is formed in the internal surface of the body and is visible through the body of the part from the external surface. In some embodiments, the part is within a mobile phone.

34 Claims, 5 Drawing Sheets

INTERNAL PART DESIGN, MOLDING AND SURFACE FINISH FOR COSMETIC APPEARANCE

BACKGROUND OF THE INVENTION

The present invention relates generally to methods for manufacturing parts having cosmetic features, and more specifically, to a method for manufacturing a part utilizing internally formed shapes and surface finish to provide cosmetic features in the part.

Figure 1:
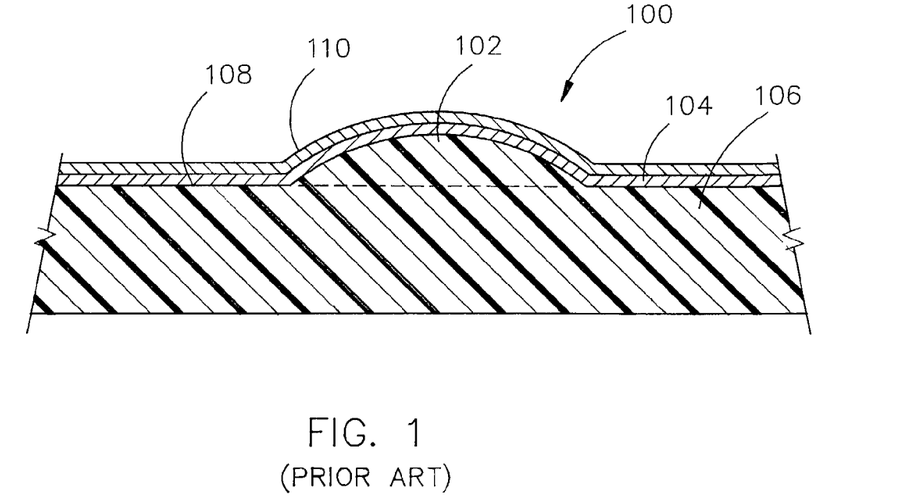
FIG. 1 is a cross-sectional side elevation view of a part having a cosmetic feature manufactured utilizing a method in accordance with the prior art.

Parts used in consumer products such as telephones, handheld computers, laptop computers, televisions, and the like are often provided with cosmetic features to improve the aesthetic appeal of the products to consumers and/or to enhance the functionality and usefulness of the product. Traditional methods employed in the manufacture of parts having cosmetic features involve applying a surface finish such as paint, etching, screen-printing, or the like to the external surface of the part after the part is molded. FIG. 1 illustrates a part 100 manufactured using this approach to cosmetic design. As shown in FIG. 1, a shape 102 corresponding to the shape of the desired cosmetic feature is formed in the external surface 108 of the body 106 of the part 100. One or more surface finishes 104 such as paints, inks, or the like are next applied to the external surface 108 over the formed shape 102. These surface finishes 104 may then be coated with a protective layer 110 such as polyurethane or varnish to protect the surface finishes 104. In many applications, the surface finishes 104 and protective layer 110 are applied to the external surface 108 without formation of a shape 102 providing a more two-dimensional surface to the part 100 that is less subject to damage and wear. However, such parts may fail to posses the aesthetic impact provided by a part 100 having a more three-dimensional surface.

Over time, repeated use of the product may degrade the protective layer 110 and surface finishes 104 applied to the external surface 108 of the part 100, causing the surface finishes 104 to appear damaged or obscured. This damage may greatly diminish the aesthetic appeal of the consumer product containing the part 100, often leading the consumer to believe that the product is of substandard quality and durability.

Consequently, it is desirable to provide a method for manufacturing a part that is suitable for use in a consumer product or the like, wherein cosmetic features of the part are robust and durable and do not deteriorate during use.

SUMMARY OF THE INVENTION

The present invention is directed to a part employing internally formed shapes and surface finish to provide cosmetic features or design elements and a method for its manufacture. Because the cosmetic features are internal, they do not deteriorate over time due to use of the product containing the part, making the product more durable and robust.

According to specific embodiments, the present invention provides a part having one or more internally formed cosmetic features viewable from an external surface of the part. The part comprises a body, at least a portion of which is molded of a transparent or semi-transparent material having an internal surface and an external surface. A cosmetic feature is formed in the internal surface of the body and is visible through the body of the part from the external surface. In one embodiment, the body and cosmetic feature are molded using a multi-shot molding process. Alternately, the cosmetic feature may comprise a shape formed in the internal surface of the part that generally corresponds to the shape of the cosmetic feature. A surface finish is applied to the shape to form the cosmetic feature so that the feature is visible from the external surface of the part.

According to other specific embodiments, the present invention provides a method for manufacturing a part having one or more internally formed cosmetic features viewable from an external surface of the part. The method comprises the steps of molding at least a portion of the body of the part of a transparent or semitransparent material and forming the cosmetic feature in the internal surface of the body, so that the cosmetic feature is visible from the external surface of the body. In one embodiment, the step of forming the cosmetic feature comprises molding the cosmetic feature to the internal surface of the body using a multi-shot molding process. Alternately, the step of forming the cosmetic feature may comprise forming a shape substantially corresponding to the shape of the cosmetic feature in the internal surface of the body and applying a surface finish over the shape for forming the cosmetic feature.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

DETAILED DESCRIPTION OF SPECIFIC EMBODIMENTS

Reference will now be made in detail to the presently preferred embodiments of the invention, examples of which are illustrated in the accompanying drawings.

Figure 2:
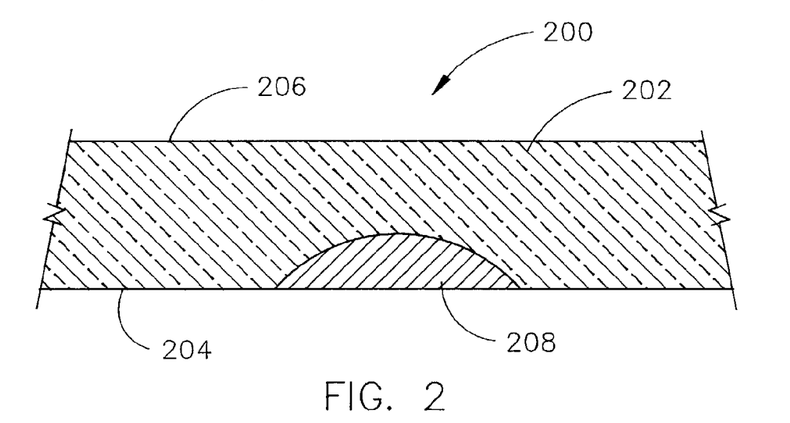
FIG. 2 is a partial cross-sectional side elevation view of a part having a cosmetic feature molded to an interior surface of the part in accordance with an exemplary embodiment of the present invention.

FIG. 2 illustrates a part manufactured in accordance with an exemplary embodiment of the present invention. Part 200 is comprised of a body 202 having an internal surface 204 and an external surface 206. At least a portion of body 202 is formed of a transparent or semi-transparent material. A cosmetic feature 208 is formed in the internal surface 204 of the body 202 so that the feature 208 is visible through the body 202 to a person viewing external surface 206.

In exemplary embodiments, body 202 and cosmetic feature 208 may be molded using a multi-shot molding process (see FIGS. 4A and 4B) so that body 202 is overmolded onto cosmetic feature 208, or alternately, cosmetic feature 208 is overmolded onto body 202. In such embodiments, body 202 may be entirely transparent or semi-transparent, or, alternately, may be formed to include opaque, transparent and/or semi-transparent portions. Body 202 (or, alternately, the transparent or semi-transparent portions of body 202) may be molded from a thermoplastic or a thermoset material that is transparent or semi-transparent when cured. Exemplary materials suitable for use in fabricating body 202 include plastics such as polycarbonates and methyl methacrylate ester polymers, glass, and the like. Substances such as metal flakes, glitter, colored fibers, or the like may be suspended within the material of body 202 (or, alternately, the transparent or semi-transparent portions of body 202) during molding for further decoration of the part 200.

Cosmetic feature 208 may be formed of materials suitable for being co-molded with the material from which the transparent or semi-transparent portion of body 202 is molded. For example, depending on the material used to mold body 202, cosmetic feature 208 may be formed of a polycarbonate plastic, a methyl methacrylate ester polymer, glass, or the like. This material may be tinted to be opaque or at least partially opaque compared to the material of body 202 and, optionally, to provide a desired color to cosmetic feature 208. Moreover, by utilizing a multi-shot molding process, cosmetic feature 208 may be provided in a variety of colors by molding portions of the cosmetic feature of resins tinted with different colored pigments. Further, in exemplary embodiments, one or more surface finishes (e.g., paint, ink, etching, polishing, screen-printing, in-mold decoration (IMD), and the like) may be applied to cosmetic feature 208 prior to overmolding of body 202, or alternately, to body 202, prior to overmolding of cosmetic feature 208.

Figure 3:
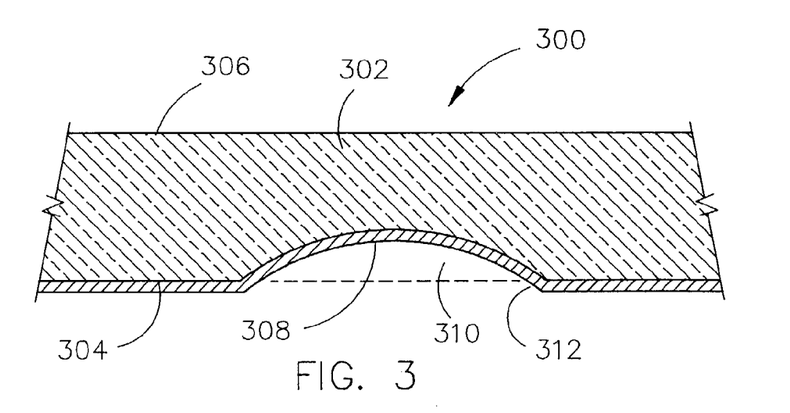
FIG. 3 is a partial cross-sectional side elevation view of a part having a cosmetic feature formed in an interior surface of the part wherein a surface finish is applied to the feature in accordance with a second exemplary embodiment of the present invention.

FIG. 3 illustrates a part manufactured in accordance with a second exemplary embodiment of the present invention. Like part 200, part 300 is comprised of a body 302, at least a portion of which is formed of a transparent or semi-transparent material. Body 302 includes an internal surface 304 and an external surface 306. A cosmetic feature 308 is formed in the internal surface 304 of the body 302 so that the feature 308 is visible through the body 302 of the part 300 to a person viewing the external surface 306. In the embodiment shown in FIG. 3, cosmetic feature 308 is comprised of a shape 310 that generally corresponds to the shape of the cosmetic feature 308 in outline, size and depth, formed in the internal surface 304 of body 302. Feature 308 can have one or more surface finishes 312 applied to shape 310 on the internal surface 304 of body 302. Exemplary surface finishes 312 include paint, ink, etching of the surface of the shape, polishing of the surface of the shape, screen-printing, in-mold decoration (IMD), and the like.

Molding processes that may be adapted for use in the fabrication of body 302 include, but are not limited to, reaction injection molding (RIM), compression molding, foam urethane molding, reinforced foam molding, air casting, vacuum casting, dip casting, wax model casting, extrusion/blow molding, thermoforming, rotational casting, lost core molding, and multi-shot molding. Shape 310 is preferably molded into interior surface 304 during the molding process, or, alternately, may be carved or machined into interior surface 304 after body 302 is molded. Where body 302 is molded using a multi-shot molding process, body 302 may be formed to include opaque, transparent and/or semi-transparent portions. In such embodiments, shape 310 is formed on interior surface 304 within a transparent or semi-transparent portion of body 302. However, it is contemplated that a portion of shape 310 may extend into an opaque portion of body 302 if desired, for example, to give cosmetic feature 308 a desired visual effect.

Body 302 (or, alternately, the transparent or semi-transparent portion of body 302) may be molded from a thermoplastic or a thermoset material that is transparent or semi-transparent when cured. Exemplary materials include plastics such as transparent or translucent polycarbonates and methyl methacrylate ester polymers, glass, or the like. Substances such as metal flakes, glitter, colored fibers, or the like may be suspended within the material of body 302 (or, alternately, the transparent or semi-transparent portions of body 302) during molding for further decoration of the part 300.

In FIGS. 2 and 3, cosmetic features 208 and 308 are illustrated as being formed as a single, uniform region molded as a simple dome extending into body 202 or 302. However, those of skill in the art will appreciate that, in accordance with the present invention, cosmetic features may be formed which have a variety of designs and shapes. Such designs may include, but are not limited to, graphics and logos, abstract shapes and ornamentation, indicia such as numbers, text, or the like, or effects such as fishbowls, teardrops, honeycomb, wood grain, leather grain, and the like. Further, by molding internal shapes, special effects utilizing shadow, light and material properties are possible. Moreover, although cosmetic features 208 and 308 are illustrated as being formed or "cut" into bodies 202 and 302, it is contemplated that cosmetic features may also be formed in relief on internal surfaces 204 and 304 to provide greater depth to the cosmetic feature and/or greater apparent differences in depth between two or more cosmetic features. In this manner, a cosmetic feature such as, for example, a graphic, logo, or ornamental design may be provided with multiple colors, textures, depths, or the like depending on the molding technology employed to produce the part.

Figure 4A:
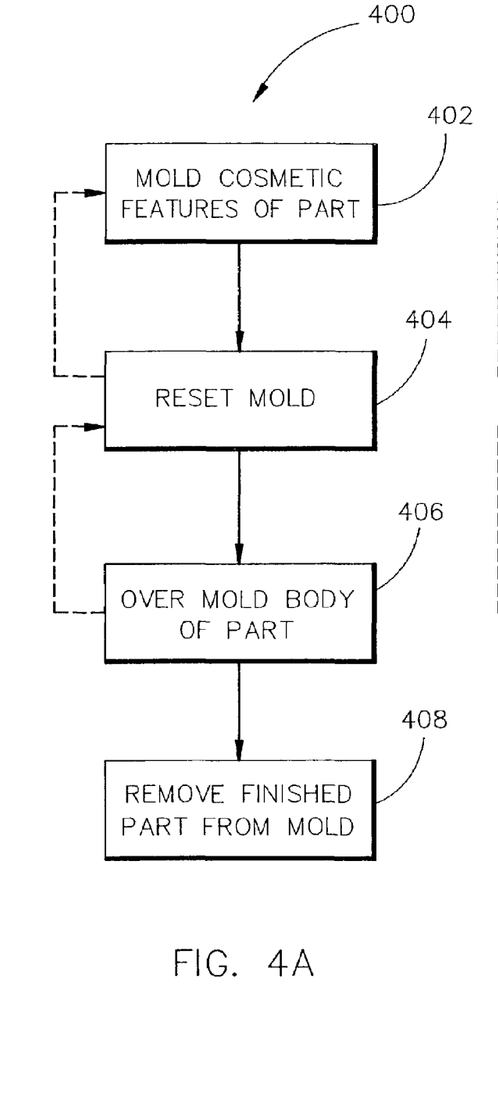
FIGS. 4A and 4B are block diagrams illustrating exemplary methods for manufacturing a part having internal cosmetic features, wherein the part is molded using a multi-shot molding process.
Figure 4B:
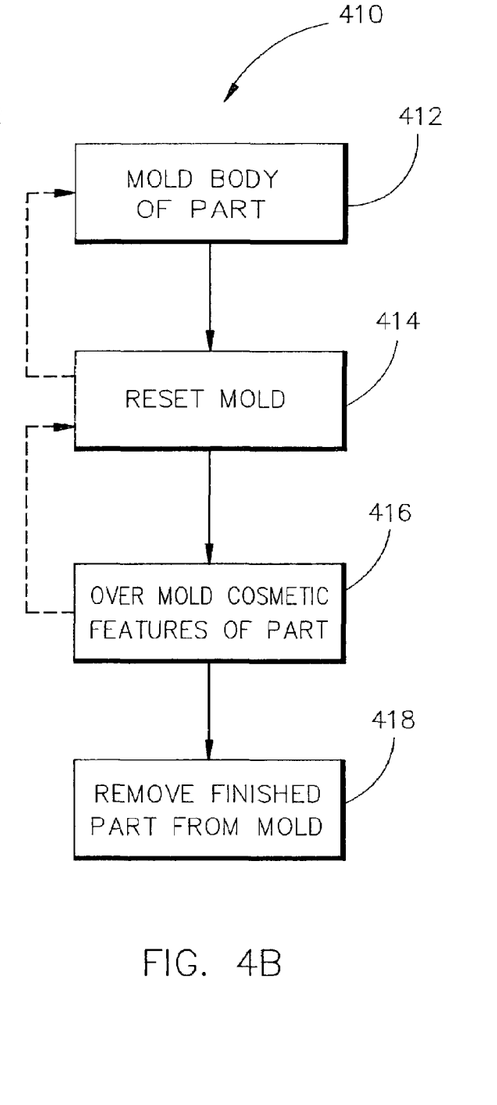

Referring now to FIGS. 4A and 4B, exemplary methods for manufacturing a part in accordance with the present invention are described. Methods 400 and 410 illustrated in FIGS. 4A and 4B, respectively, employ a multi-shot molding process for manufacturing a part, having one or more internally formed cosmetic features viewable from an external surface of the part through the body of the part (e.g., part 200 shown in FIG. 2).

In method 400, shown in FIG. 4A, the body of the part is overmolded onto the cosmetic features. Method 400 is initiated at step 402 wherein cosmetic features of the part are first molded. For example, resin may be injected into a mold and cured to form the cosmetic features. It will be appreciated that, using a multi-shot molding process, the cosmetic features of the part may themselves be molded of two or more resins, and may be molded in separate steps or "shots" of the molding process. In such embodiments, the mold may be reset, at step 404, prior to injection of different resins. Once molding of the cosmetic features is complete, the mold is reset, at step 404, so that the body of the part may be molded. Resin is then injected into the mold and cured, at step 406, to over mold the body of the part onto the cosmetic features molded at step 402. Like the cosmetic features molded in step 402, the body may be molded of two or more resins, and may be molded in separate steps or "shots" of the molding process. In such embodiments, the mold may be reset, at step 404, prior to injection of different resins. The finished part may then be removed from the mold at step 408.

In method 410, shown in FIG. 4B, the cosmetic features of the part are overmolded onto the body of the part. Method 410 is initiated at step 412 wherein resin is injected into a mold and cured to form the body of the part. Again, the body may be molded of two or more resins, and may be molded in separate steps or "shots" of the molding process. In such embodiments, the mold may be reset, at step 414, prior to injection of different resins. Once molding of the body is complete, the mold is reset, at step 414, so that the cosmetic features of the part may be molded. Resin is then injected into the mold and cured, at step 416, to over mold the cosmetic features onto the body of the part molded at step 412. Like the body molded in step 412, cosmetic features of the part may be molded of two or more resins, and may be molded in separate steps or "shots" of the molding process. In such embodiments, the mold may be reset, at step 414, prior to injection of different resins. The finished part may then be removed from the mold at step 418.

As discussed in the description of FIG. 2, the body of the part (or, alternately, a portion of the body of the part) may be molded from a thermoplastic or a thermoset material that is transparent or semi-transparent when cured. Cosmetic features of the part may be formed of materials suitable for being co-molded with the material from which the transparent or semi-transparent portion of the body is molded. Exemplary materials suitable for use in fabricating the body and cosmetic feature include plastics such as polycarbonates and methyl methacrylate ester polymers, glass, and the like. Substances such as metal flakes, glitter, colored fibers, or the like may be suspended within resins injected into the mold to form the body and cosmetic features at steps 402 and 406 for further decoration of the part. Further, in exemplary embodiments, one or more surface finishes (e.g., paint, ink, etching, polishing, screen-printing, in-mold decoration (IMD), and the like) may be applied to the cosmetic features prior to over molding of the body at step 406 to further enhance the appearance of the features when viewed through the body.

Figure 5:
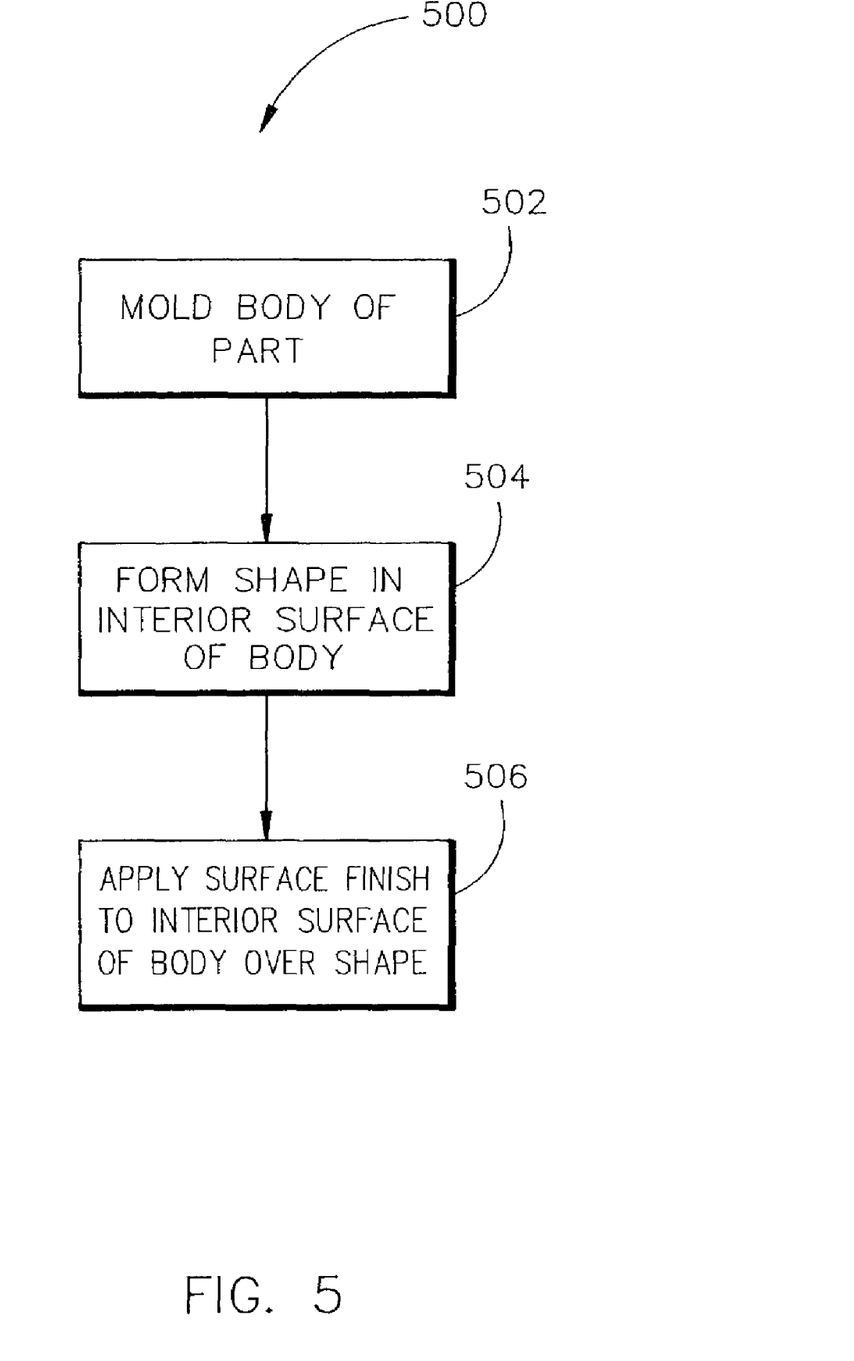
FIG. 5 is a block diagram illustrating an exemplary method for manufacturing a part having internal cosmetic features formed therein, wherein the cosmetic feature is comprised of a shape formed in the interior surface of the part and a surface finish applied to the shape.

Turning now to FIG. 5, a method 500 for manufacturing a part in accordance with the second exemplary embodiment of the present invention is described. Method 500 is suitable for use in manufacturing a part having cosmetic features comprised of internally formed surface features provided with a surface finish that are viewable from an external surface of the part (e.g., part 300 shown in FIG. 3). In the exemplary embodiment illustrated, method 500 is initiated at step 502, wherein the body of the part is molded using a suitable molding process such as reaction injection molding (RIM), compression molding, foam urethane molding, reinforced foam molding, air casting, vacuum casting, dip casting, wax model casting, extrusion/blow molding, thermoforming, rotational casting, lost core molding, multi-shot molding, or the like. As discussed in the description of FIG. 3, the body of the part may be molded from a thermoplastic or a thermoset material that is transparent or semi-transparent when cured. Exemplary materials suitable for use in fabricating the body and cosmetic feature include plastics such as polycarbonates and methyl methacrylate ester polymers, glass, and the like. Substances such as metal flakes, glitter, colored fibers, or the like may be suspended within the resin injected into the mold to form the body for further decoration of the part.

A shape corresponding to the cosmetic feature is formed in the internal surface of the body at step 504. In one embodiment, the shape may be integrally formed in the internal surface of the body as it is molded in step 502. Alternately, the shape may be carved or machined into interior surface after the body is molded. One or more surface finishes are next applied to the interior surface of the body over the shape at step 506. For example, the part may be removed from the mold and painted at step 506. Alternately, the surface of the shape may be etched or polished, screen-printing, appliqués, aquagraphics, or the like may be applied to the interior surface of the body of the part after removal of the part from the mold, or an in-mold decoration (IMD) process may be used to apply the surface finish or finishes during molding of the body of the part at step 502.

Figure 6:
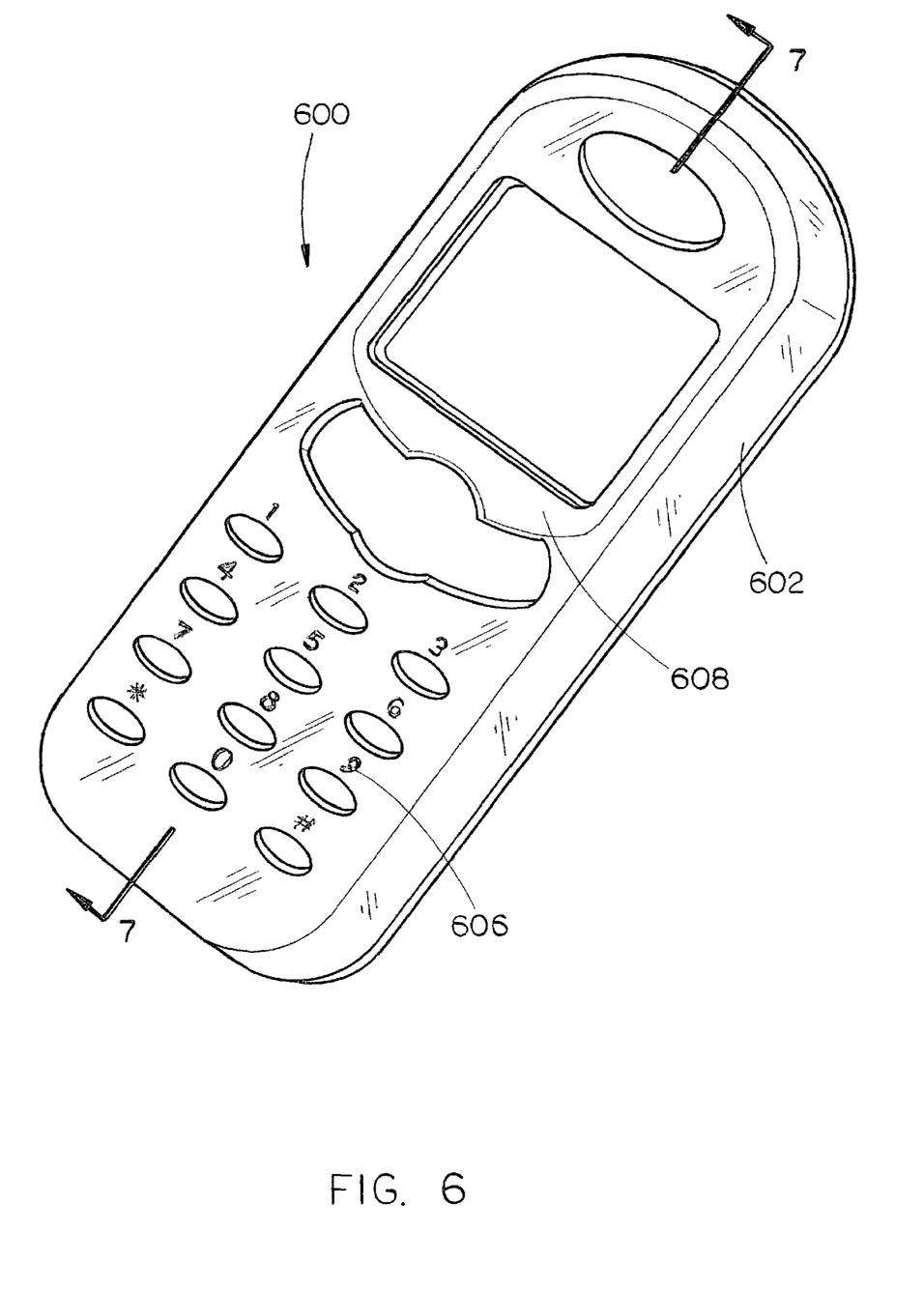
FIG. 6 is an isometric view illustrating a part manufactured in accordance with the exemplary methods shown in FIGS. 4 and 5.
Figure 7:
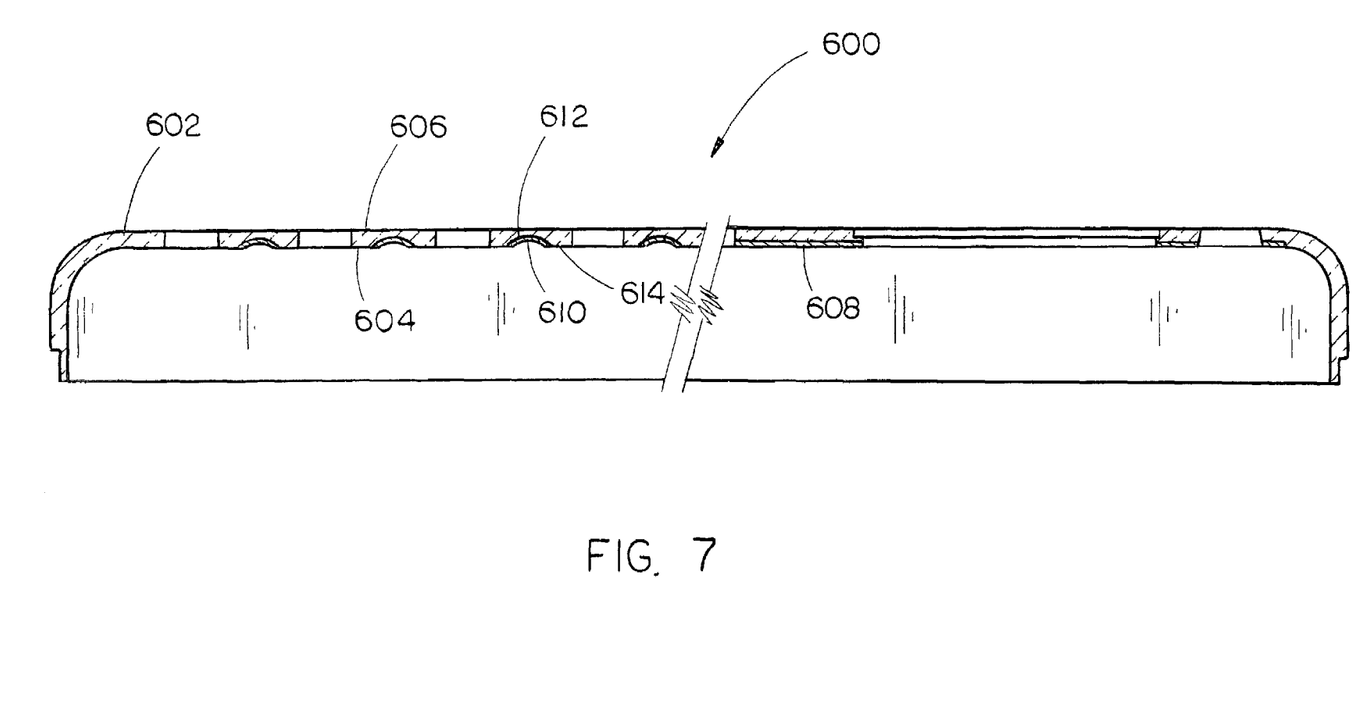
FIG. 7 is a cross-sectional side elevation view of the part shown in FIG. 6.

FIGS. 6 and 7 illustrate an exemplary part manufactured in accordance with the present invention. Part 600, which in the embodiment shown comprises a front housing or shell for a cellular telephone, includes a body 602 formed of a transparent or semi-transparent material having an internal surface 604 and an external surface 606. A plurality of cosmetic features including display panel ornamentation 608 and keypad indicia (i.e., the numbers "0" through "9") 610 are formed in the internal surface 604 of body 602, and are visible through the body 602 to a person viewing external surface 606.

In the exemplary embodiment shown, display panel ornamentation 608 is molded into body 602 using a multi-shot molding process in accordance with methods 400 or 410 illustrated in FIGS. 4A and 4B. Keypad indicia 610 are formed in body 602 using internal surface finish in accordance with method 500 illustrated in FIG. 5. Keypad indicia and are comprised of shapes 612 generally having the form of the numbers "0" through "9" molded into the internal surface 604 of body 602. A surface finish 614 is applied to shapes 612 on the internal surface 604 of body 602. Preferably, the surface finish 614 is visible to a person viewing part 600 from external surface 606, causing the numbers "0" through "9" to appear to be suspended within the body 602 of the part 600.

Internally molded shapes and surface finish may be used to create, highlight and provide visual effects to parts manufactured in accordance with the present invention. In this manner, parts having unique cosmetic appearances may be manufactured, enhancing the aesthetic appeal of the products in which they are assembled. Further, because the cosmetic features formed are internal to the product, the features are not subject to wear and degradation due to repeated use and handling of the product over time. In this manner, parts may be provided which have a more robust and durable surface finish. Moreover, cosmetic features may be created using a variety of materials that are not suited for use in the external surfaces of parts used in consumer products, and the like.

Traditional external cosmetic design often requires the use of a "hard" coating applied to the exterior surface of the part. This coating covers any cosmetic details and provides a clear protective layer. Parts manufactured employing internal cosmetic design in accordance with the present invention do not require this coating, simplifying manufacturing of the part and resulting in substantial cost savings. Moreover, where internal design features are "carved into" the internal surface of the part (as opposed to being formed in relief), less material is required for production of the part resulting in reduced material costs.

As described herein, an internal surface comprises a surface of a part that is not meant to be directly or indirectly viewed, while an external surface comprises a surface of the part that is normally meant to be viewed. For example, in the exemplary embodiment shown in FIGS. 6 and 7, internal surface 604 comprises a surface of telephone housing part 600 that is normally internal to the telephone when part 600 is assembled into the telephone. In this embodiment, external surface 606 forms a portion of the exterior surface of the housing of the telephone.

It will be appreciated by those of skill in the art, that various molding technologies may be adapted for molding the body and cosmetic features of the part depending on the particular requirements of the manufacturer. Such molding technologies include, but are not limited to, multi-shot molding, reaction injection molding (RIM), compression molding, foam urethane molding, reinforced foam molding, air casting, vacuum casting, dip casting, wax model casting, extrusion/blow molding, thermoforming, rotational casting, and lost core molding. Consequently, it is contemplated that the exact configuration of molding apparatus may be modified by those of skill in the art to accommodate the specific molding technology employed. Such modification would not depart from the scope and spirit of the present invention as claimed in the appended claims.

Although the invention has been described with a certain degree of particularity, it should be recognized that elements thereof may be altered by persons skilled in the art without departing from the scope and spirit of the invention. It is understood that the specific orders or hierarchies of steps in the methods 400 and 500 illustrated in FIGS. 4 and 5, respectively, are examples of exemplary approaches. Based upon design preferences, it is understood that the specific orders or hierarchies of these methods can be rearranged while remaining within the scope of the present invention. The accompanying method claims present elements of the various steps of methods 400 & 500 in a sample order, and are not meant to be limited to the specific order or hierarchy presented.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for manufacturing a part having a cosmetic feature, comprising:
    molding at least a portion of a body of the part of a transparent or semi-transparent material, the body of the part having an internal surface and an external surface; and
    forming the cosmetic feature in the internal surface by forming a shape in the internal surface of the body, the shape generally corresponding to the shape of the cosmetic feature, and applying a surface finish to the shape for forming the cosmetic feature, wherein the cosmetic feature is visible from the external surface.

2. The method as claimed in claim 1, wherein the step of forming the cosmetic feature comprises molding the cosmetic feature, and wherein the step of molding at least a portion of the body of a transparent or semi-transparent material comprises over-molding the body onto the cosmetic feature using a multi-shot molding process.

3. The method as claimed in claim 1, wherein the step of forming the cosmetic feature comprises over-molding the cosmetic feature onto the body using a multi-shot molding process.

4. The method as claimed in claim 1, wherein the step of applying a surface finish to the shape comprises painting the shape.

5. The method as claimed in claim 1, wherein the step of applying a surface finish to the shape comprises etching the shape.

6. The method as claimed in claim 1, wherein the step of applying a surface finish to the shape comprises polishing the shape.

7. The method as claimed in claim 1, wherein the step of applying a surface finish to the shape comprises applying decoration to the shape using in-mold decoration.

8. A method for manufacturing a part having a cosmetic feature, comprising:
    molding at least a portion of a body of the part of a transparent or semi-transparent material, the body having an internal surface and an external surface; and
    molding the cosmetic feature to the internal surface by forming a shape in the internal surface of the body, the shape generally corresponding to the shape of the cosmetic feature, and applying a surface finish to the shape for forming the cosmetic feature, wherein the cosmetic feature is visible from the external surface.

9. The method as claimed in claim 8, wherein the step of molding at least a portion of the body of the part of a transparent or semi-transparent material comprises over-molding the body onto the cosmetic feature using a multi-shot molding process.

10. The method as claimed in claim 8, wherein the step of molding the cosmetic feature comprises over-molding the cosmetic feature onto the body using a multi-shot molding process.

11. A method for manufacturing a part having a cosmetic feature, comprising:
    molding a body of the part, the part being at least partially transparent and having an external surface and an internal surface;
    forming a shape in the internal surface, the shape substantially corresponding to the shape of the cosmetic feature; and
    applying a surface finish to the shape to form the cosmetic feature, wherein the cosmetic feature is visible from the external surface.

12. The method as claimed in claim 11, wherein the step of applying a surface finish to the shape comprises painting the shape.

13. The method as claimed in claim 11, wherein the step of applying a surface finish to the shape comprises etching the shape.

14. The method as claimed in claim 11, wherein the step of applying a surface finish to the shape comprises polishing the shape.

15. The method as claimed in claim 12, wherein the step of applying a surface finish to the shape comprises applying decoration to the shape using in-mold decoration.

16. A part, comprising:
    a body having an internal surface and an external surface, at least a portion of the body being molded of a transparent or semi-transparent material; and a cosmetic feature formed in the internal surface, the cosmetic feature including a shape formed in the internal surface of the part, the shape generally corresponding to the shape of the cosmetic feature, and a surface finish applied to the shape, the surface finish being visible from the external surface of the part, wherein the cosmetic feature is visible through the body of the part from the external surface.

17. The part as claimed in claim 16, wherein the cosmetic feature is molded.

18. The part as claimed in claim 16, wherein the cosmetic feature is overmolded onto the body using a multi-shot molding process.

19. The part as claimed in claim 16, wherein the surface finish comprises paint.

20. The part as claimed in claim 16, wherein the surface finish comprises etching of the shape.

21. The part as claimed in claim 16, wherein the surface finish comprises polishing of the shape.

22. The part as claimed in claim 16, wherein the surface finish comprises decoration applied using in-mold decoration.

23. The part as claimed in claim 17, wherein the body is overmolded onto the cosmetic feature using a multi-shot molding process.

24. The part as claimed in claim 16, wherein the part is within a mobile phone.

25. The part as claimed in claim 23, wherein the cosmetic feature is over-molded onto the body using a multi-shot molding process.

26. A part having a cosmetic feature, comprising:
a body having an interval surface and an external surface, at least a portion of the body being molded of a transparent or semi-transparent material;
a shape formed in the internal surface, the shape generally corresponding to the shape of the cosmetic feature; and
a surface finish applied to the shape for forming the cosmetic feature,
wherein the cosmetic feature is visible from the external surface though the body of the part.

27. The part as claimed in claim 26, wherein the surface finish comprises paint.

28. The part as claimed in claim 26, wherein the surface finish comprises etching of the shape.

29. The part as claimed in claim 26, wherein the surface finish comprises polishing of the shape.

30. The part as claimed in claim 26, wherein the surface finish comprises decoration applied to the shape using in-mold decoration.

31. The part as claimed in claim 26, wherein the part is within a mobile phone.

32. A mobile phone comprising:
a body having an internal surface and an external surface, at least a portion of the body being molded of a transparent or semi-transparent material; and
a cosmetic feature formed in the internal surface, the cosmetic feature including a shape formed in the internal surface of the part, the shape generally corresponding to the shape of the cosmetic feature, and a surface finish applied to the shape, the surface finish being visible from the external surface of the part,
wherein the cosmetic feature is visible through the body of the part from the external surface.

33. The mobile phone as claimed in claim 34, wherein the cosmetic feature is overmolded onto the body using a multi-shot molding process.

34. The mobile phone as claimed in claim 32, wherein the surface finish comprises painting, etching, polishing, or in-mold decorating, or a combination thereof.

* * * * *